INVENTOR
OTTO VOEGELI
BY Stephen J. Limanek
ATTORNEY

3,452,334
MAGNETIC FILM MEMORIES WITH AN INTERMEDIATE CONDUCTIVE ELEMENT AS A DRIVE LINE RETURN PATH

Otto Voegeli, West Lafayette, Ind., assignor to International Business Machines Corporation, Armonk, N.Y., a corporation of New York Filed Dec. 28, 1964, Ser. No. 421,233
Int. Cl. G11b 5/66
U.S. Cl. 340—174 18 Claims

ABSTRACT OF THE DISCLOSURE

Stray magnetic fields which cause undesirable creeping effects in a coupled magnetic film memory are avoided by arranging the magnetic films and their drive lines in such relationship to the conductive ground plane that the paired films storing each bit always are magnetized in antiparallel directions, regardless of which drive current is flowing. Return paths for both word and bit drive currents are provided in a ground plane or other conductive sheet which lies between the films. Because the currents flowing through this sheet and the drive lines connected thereto tend to impart antiparallel magnetizations to the magnetic films, stray fields from one bit-storing position to another are prevented. The magnetic films may be formed as sheets or strips, and the drive currents will define the individual bit-storing positions therein.

Figures 1, 1A, 2, 3, 3A:
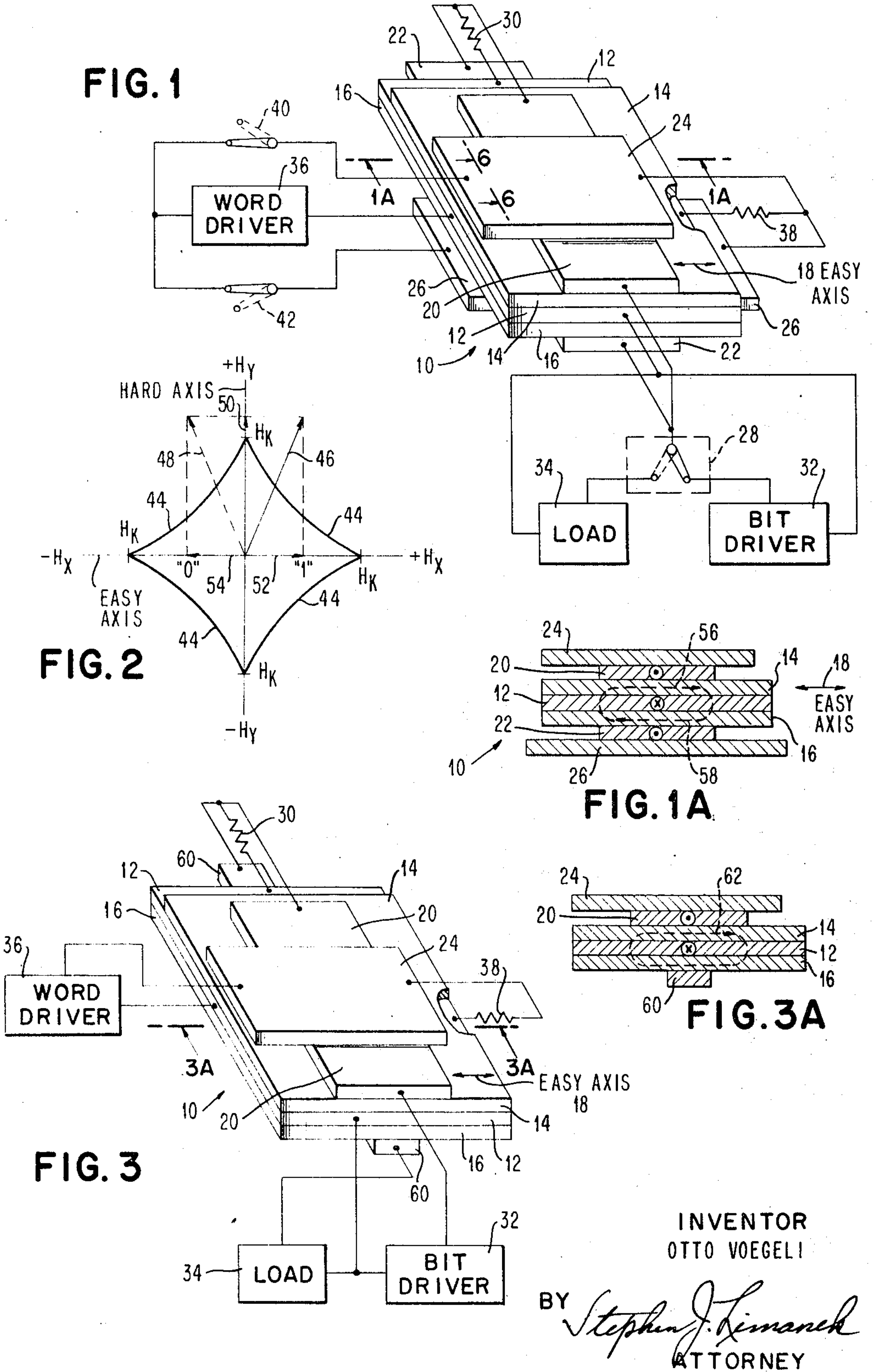

This invention relates to magnetic film storage systems and more particularly to improved continuous sheet film systems.

In the presently used memory film elements having an easy axis of magnetization, a 0 bit of information is represented by magnetization of one of the film elements in a given direction along the easy axis and a 1 bit of information is represented by magnetization in the opposite easy direction. Drive lines are used with these elements which may include a first strip line disposed along the easy axis of the element for producing a magnetic field in the film element in the hard direction and a second strip line disposed along the hard axis, that is, perpendicular to the first line, to produce a magnetic field in a selected one of the two easy axis directions. The first line is generally referred to as the "word line" and the second line is the "bit line." In an array employing discrete magnetic film elements, a large demagnetizing field occurs at the boundary of each element. The demagnetizing field creates spontaneously domains with reversed direction of the magnetization. These domains, called demagnetizing domains, increase in size gradually when exposed to small changing fields, as produced by neighboring bit and word lines. Through this creeping disturb process, the stored information is eventually lost. In an attempt to overcome the loss of information by the disturb fields, it has been suggested to choose the dimensional areas, thickness, the critical field and rotational threshold of the film such that the disturb sensitivity decreases to a tolerable limit.

In order to produce magnetic film memories wherein the disturb sensitivity decreases to a tolerable limit, considerable care must be exercised in the production of each layer of material employed regardless of whether it be a magnetic strip or dot, an insulator or an electrical conductor. Unless the magnetic film memory plane is properly fabricated, not only is there encountered the creeping problem, but also a lack of uniformity of output voltage from one bit position to another.

To overcome the problems encountered in the construction of magnetic film memory systems, it has been suggested that a pair of strips of magnetic material be employed which are disposed in either parallel or orthogonal relationship to each other to form coupled films. Memory planes made from strips of magnetic material have been described in more detail in commonly assigned copending applications having Ser. 357,417 filed by H. Chang and E. R. Genovese and Ser. No. 364,982, filed by O. Voegeli. It has been shown that the magnetic strip type memory planes provide a high ratio between required drive fields and the threshold for creeping disturb of the information due primarily to the fact that such planes lack stray fields at the edges of storage cells formed by the magnetic strips and the word and bit drive lines. When a closed flux path is provided in a magnetic element, no demagnetizing domains occur spontaneously. For creeping disturb to occur, a comparatively large field threshold has to be exceeded, to create demagnetizing domains. This threshold, called nucleation field, can be higher than either the coercive force $H_c$ or the uniaxial anisotropy field $H_k$.

Although the magnetic strip type memory planes have operated satisfactorily, the open flux configuration of the storage cells during the read operation produces the following adverse effects: (a) the appearance of a stray field in the direction of the bit line limits the packing density along the bit line and (b) the appearance of a demagnetizing field requires the use of a larger word field.

It has also been suggested that a memory plane be made in the form of a continuous sheet of magnetic material with storage cells being defined simply by the intersection of orthogonally arranged word and bit lines. Such memory planes have the advantage of ease of fabrication but they encounter the creep problem due to the large stray fields produced therein. Furthermore, these single continuous sheet memory planes have operational requirements which call for large hard direction magnetic fields.

It is an object of this invention to provide an improved coupled magnetic film structure.

It is another object of this invention to provide an improved coupled magnetic film memory plane having a higher storage cell packing density.

Yet another object of this invention is to provide an improved coupled magnetic film plane wherein the magnetization remains always in the anti-parallel state, thus eliminating stray fields.

A further object of this invention is to provide a coupled film memory plane which employs thick magnetic layers.

Yet a further object of this invention is to provide a magnetic film memory plane by a simplified fabrication process.

Still a further object of this invention is to provide a structure where no registration is necessary between the storing plane and the driveline pattern.

An additional object of this invention is to provide continuous magnetic layers, wherein dispersion, rippling and skew of the magnetization is minimized, due to the lack of stray fields at the bit boundaries.

Still another object of this invention is to provide a creep-free memory system which may be word or bit organized.

In accordance with the present invention, a magnetic film system is provided which includes a pair of continuous sheets of magnetic material between which there is disposed an electrically conductive layer arranged to break off the magnetic exchange coupling between the pair of magnetic sheets and to conduct the drive currents, a first set of parllel drive lines disposed on at least one outer side of said pair of magnetic sheets and a second pair of parallel drive lines arranged perpendicular to said first set of drive lines and disposed on said outer side of the magnetic sheets to form coupled film storage cells each having anti-parallel magnetization.

An important advantage of this invention is that a creep-free magnetic film system having a high packing density is provided by a simplified fabrication process.

An important feature of this invention is that the magnetization in the coupled film areas forming a storage cell of the memory plane of the system remains always in an anti-parallel state regardless of whether the magnetization is along the easy axis, the hard axis, or during the switching process any intermediate axis.

The foregoing and other objects, features and advantages of the invention will be apparent from the following more particular description of preferred embodiments of the invention, as illustrated in the accompanying drawings.

Figure 4:
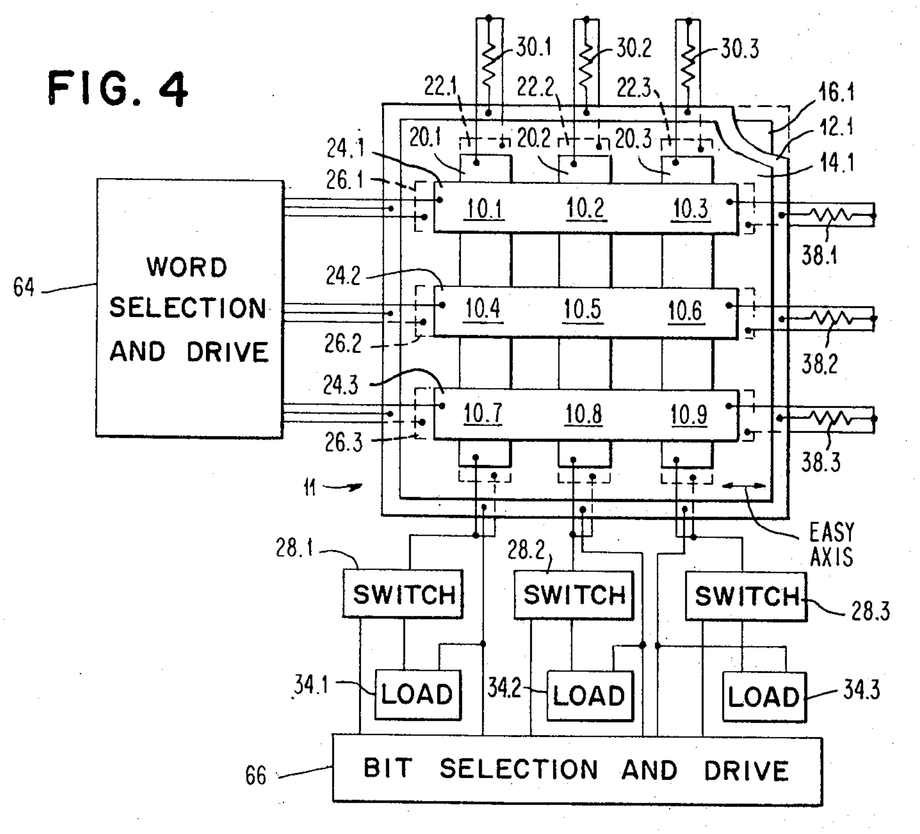
Figure 5:
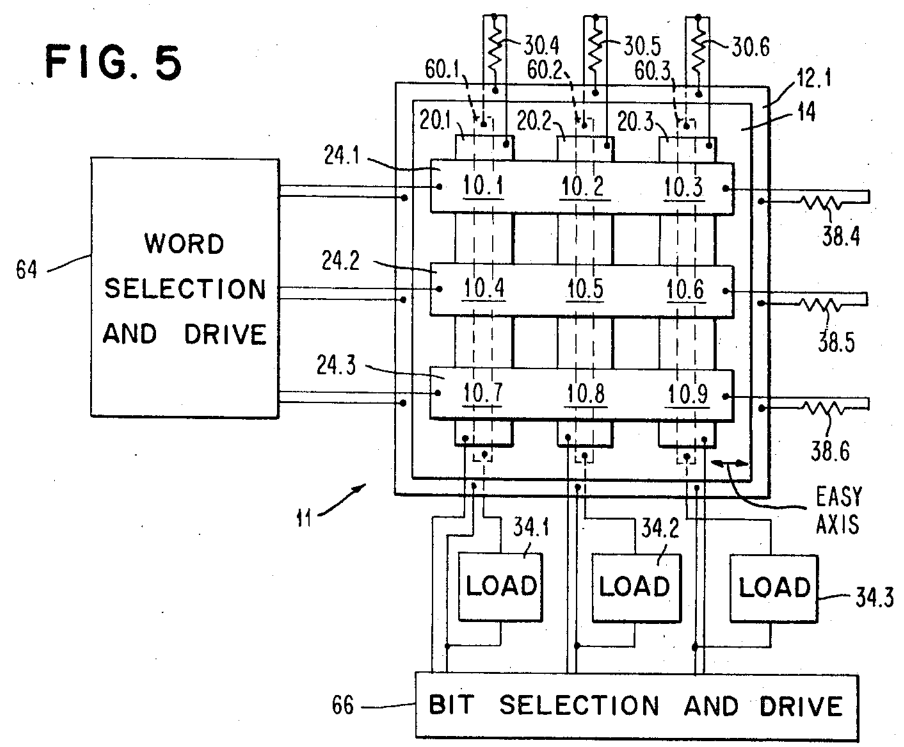
Figure 6:
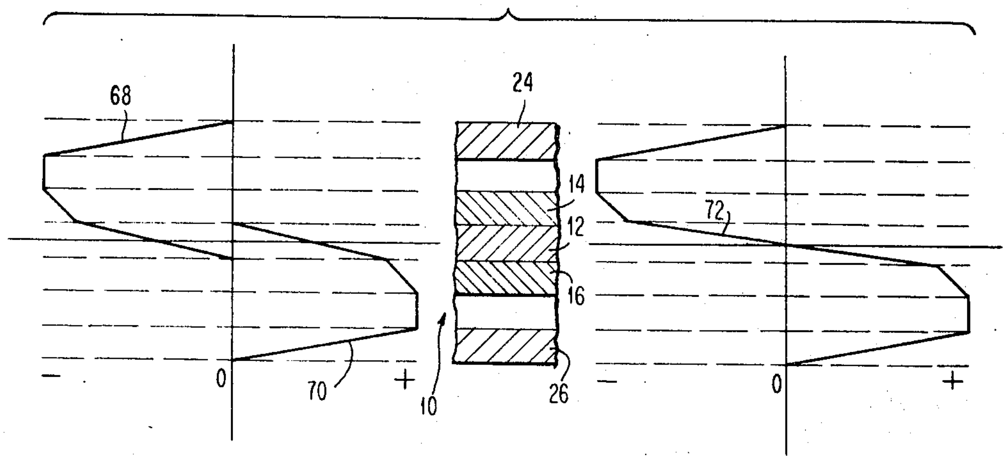
Figure 7:
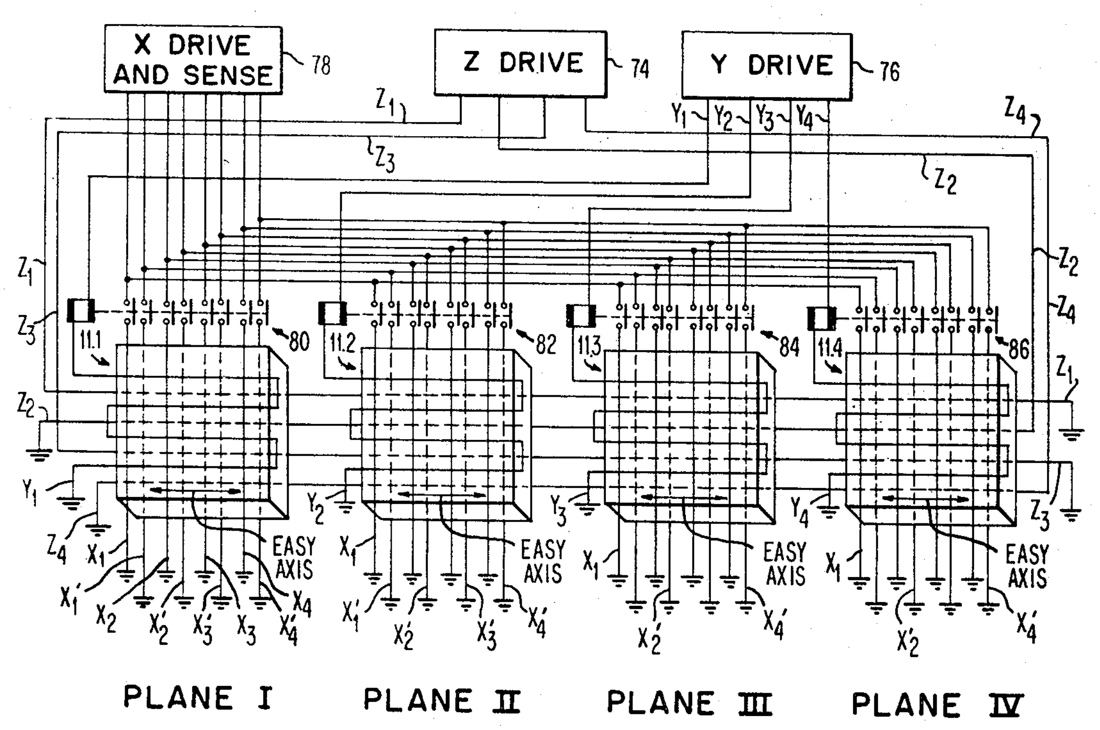

In the drawings:

FIG. 1 illustrates an embodiment of a symmetrical magnetic film storage system of the present invention showing only one storage cell thereof, FIG. 1A is a cross-sectional view of the system illustrated in FIG. 1 taken through the line 1A—1A, FIG. 2 shows the rotational switching critical curve for magnetic material which may be used in the system illustrated in FIGS. 1 and 1A, FIG. 3 illustrates an embodiment of an unsymmetrical magnetic film storage system of the present invention showing only one storage cell thereof, FIG. 3A is a cross-sectional view of the unsymmetrical system illustrated in FIG. 3 taken through line 3A—3A, FIG. 4 shows a magnetic film storage system of the present invention which includes a planar array having a plurality of storage cells driven in a symmetrical manner as illustrated in FIGS. 1 and 1A, FIG. 5 shows a magnetic film storage system of the present invention which includes a planar array having a plurality of storage cells driven in an unsymmetrical manner as illustrated in FIGS. 3 and 3A, FIG. 6 illustrates various magnetic fields produced in a cross-section of the system shown in FIG. 1 indicated by line 6—6, and FIG. 7 illustrates a 3-dimensional embodiment of the present invention.

Referring to the drawings in more detail, there is shown in FIGS. 1 and 1A an embodiment of a symmetrical magnetic film storage system of the present invention which, for purposes of illustration only, is limited to a single storage cell 10. The storage cell 10 is formed by an electrically conductive sheet 12 used as a ground plane on one side of which is deposited a first layer of magnetic material 14 and on the other side of which is deposited a second layer of magnetic material 16 and limited to an area substantially defined by a pair of intersecting drive lines as described more fully hereinafter. The first and second magnetic layers 14 and 16 are deposited on the electrically conductive sheet preferably in the presence of a magnetic field to establish an easy axis in each of the two magnetic layers 14, 16 in the direction indicated at 18. Each of the magnetic layers 14, 16 may be made of, for example, Permalloy having a thickness of approximately 1,000–20,000 A. which includes so-called "thin" and "thick" films. The electrically conductive sheet 12 may be made of, for example, gold, silver, copper or aluminum and may have a thickness of approximately 5,000–50,000 A. at normal operating temperatures. First and second flat strips of electrically conductive material 20 and 22 which may be used as a common bit and sense line, each strip having a width substantially less than that of first and second magnetic layers 14 and 16, are disposed on the first and second magnetic layers 14 and 16, respectively, in a direction perpendicular to that of the easy axis 18.

Third and fourth flat strips of electrically conductive material 24 and 26 which may be used to form a word line each having a width substantially less than that of the first and second magnetic layers 14 and 16 are disposed on the first and second magnetic layers 14 and 16, respectively, in a direction perpendicular to that of the first and second conductive strips 20 and 22.

It should be understood that suitable layers of insulation must be provided between the first and third conductive strips 20 and 24, between the second and fourth conductive strips 22 and 26, between the first conductive strip 20 and the first magnetic layer 14 and between the second conductive strip 22 and the second magnetic layer 16, which may, for example, consist of a layer of Mylar, but in the interest of clarity such insulation layers have been omitted from the drawing. The magnetic layers 14 and 16 may be applied directly to the ground plane 12, when this layer consists of an inert metal, as, for example, gold, which does not interact with the magnetic material, or diffuse into the magnetic material. If, however, a less inert metal, as, for example, copper, is used as the ground plane, then the magnetic layers have to be separated from the conducting sheet 12, by a thin layer of, for example, silicon monoxide. In any case, the magnetic material has to be deposited onto a surface of suitable smoothness, which may also be obtained by an undercoating layer of silicon monoxide. The magnetic layers 14, 16 may be formed by evaporating, electroplating or sputtering magnetic material on both sides of a continuous sheet of conductive material or a thin substrate made of insulating mtaerial may be used on which there is evaporated successively a first layer of magnetic material, a conductive layer and a second layer of magnetic material. Preformed strip lines may be used which are placed on the magnetic layers after the evaporation process is completed.

The first conductive strip 20 is connected at one end to a first switching means 28 and at the other end through any suitable terminating impedance 30 to one edge of the electrically conductive layer 12. The second conductive strip 22 is connected at one end also to the first switching means 28 and at the other end through the terminating impedance 30 to the one edge of the conductive layer 12. The first switching means 28 is operative to connect each end of the first and second conductive strips 20, 22 either to a bit line driver 32 or to a load 34, which may be a conventional sense amplifier. The bit driver 32 and the load 34 are also connected to an edge opposite said one edge of the conductive layer 12. The third conductive strip 24 is connected at one end to a first terminal of a word driver 36 and at the other end through any suitable terminating impedance 38 to a further edge of the conductive layer 12. The fourth conductive strip 26 is connected at one end to the first terminal of the word drive 36 and at the other end through the terminating impedance 38 to the further edge of the conductive layer 12. A second terminal of the word driver 36 is connected to an edge opposite said further edge of the conductive layer 12. Frst and second switches 40 and 42 may be interposed between each of the third and fourth conductive strips 24 and 26 and the first terminal of the word driver 36.

To more clearly describe the operation of the embodiment of the invention illustrated in FIGS. 1 and 1A of the drawing, reference is now had to the rotational switching curve of the magnetic material of the first and second magnetic layers 14 and 16. As indicated in FIG. 2 of the drawing, the preferred magnetization direction, that is, the easy axis of the magnetic layers 14 and 16, which is present due to the uniaxial magnetic anisotropy of the magnetic layers 14, 16, corresponds to the $H_x$ axis and the direction perpendicular to the easy axis, that is, the hard axis, corresponds to the $H_y$ axis. The anisotropy field strength, corresponding to the uniaxial magnetic anisotropy constant $k$, is indicated by $H_k=2k/M$, M being the saturation magnetization, where $H_k$ may be a value from less than 1 to about 15 oersteds. The rotational switching critical curve has four portions 44 enclosing a given area forming an asteroid defining the minimum limits of externally applied magnetic fields required to rotationally switch or reverse the magnetic state of one of the storage cells 10. A magnetic field or a combination of magnetic fields having a resultant magnitude falling without the asteroid, such as that indicated by arrows 46 or 48, irreversibly switches the magnetization in the storage cell 10 by the fast rotational process. The field indicated by arrow 46 may be produced by providing a field of a magnitude indicated by a hard direction field arrow 50 and an easy direction field indicated by an arrow 52, which latter field may be used to store a 1 bit of information in the storage cell 10, and the field indicated by arrow 48 may be produced by providing a hard direction field of a magnitude indicated by the arrow 50 and an easy direction field indicated by an arrow 54, which latter field may be used to store a 0 bit of information in the storage cell 10.

In the operation of the embodiment illustrated in FIGS. 1 and 1A of the drawing, to store information in the storage cell 10 a current pulse producing a magnetic field having a magnitude indicated by the arrow 50 is passed through the word line 24, 26 from the word driver 36 to provide a magnetic field in the storage cell 10 which is perpendicular to the easy axis of the magnetic layers 14, 16 of the storage cell 10, that is, in the direction of the hard axis of the magnetic layers 14, 16, and a positive or negative pulse producing the magnetic field indicated by the arrow 52 or arrow 54, respectively, of the FIG. 2 is passed through the bit line 20, 22 from the bit driver 32 through the switch 28 to provide a magnetic field in the storage cell 10 along the easy axis of the magnetic layers 14, 16. It can be seen that a current pulse in the word line 24, 26 produces a magnetic field in both the first and second magnetic layers of the storage cell 10 which orients the magnetization in the magnetic layers 14, 16 in a direction perpendicular to the easy axis of the film of the storage cell 10, that is, in the hard axis. Accordingly, when only a magnetic field produced by a word current is applied to the storage cell 10, the magnetization of the magnetic layers 14, 16 is indicative of neither a 0 nor a 1 bit of information in the storage cell 10. However, when current is passed concurrently through the word line 24, 26 and the bit line 20, 22 the magnetization of the magnetic layers 14, 16 is disposed in a direction located at an angle to the hard direction at one side or the other thereof in each magnetic layer 14, 16 depending upon whether a positive or negative current pulse is passing through the bit line 20, 22. To write a 1 into the storage cell 10, a given current pulse which may be arbitrarily considered as a positive current pulse from the word driver 36 is passed through the word line 24, 26 and concurrently therewith a given current pulse which may arbitrarily be designated as a positive current pulse from the bit driver 32 is passed through the bit line 20, 22. The word current pulse is terminated prior to the termination of the bit current pulse to insure the rotation of the magnetic dipoles toward the desired easy magnetic direction. When only a field produced by the positive word current pulse is applied to the storage cell 10, the magnetization in the first magnetic layer 14 may be considered to be in a given direction along the hard axis whereas the magnetization in the second magnetic layer 16 is in the opposite or anti-parallel direction with respect to the given direction. When a magnetic field is thereafter concurrently produced by the positive bit current pulse passing through the bit line 20, 22, the magnetization is rotated in a clockwise direction in both the first and second magnetic layers 14 and 16 of the storage cell 10 toward the easy axis $H_x$ of the magnetic layers 14, 16. When the positive word pulse is terminated, the magnetization in the first magnetic layer 14 is established to the right as indicated by the arrow 56 in the cross-section shown in FIG. 1A and in the second magnetic layer 16 to the left, that is, anti-parallel with respect to the magnetization in the first magnetic layer 14. By referring to FIG. 1A of the drawing it can be seen that since the magnetization in the first magnetic layer 14 is to the right and the magnetization of the second magnetic layer 16 is to the left and that the two layers are separated only by a very thin non-magnetic layer, a substantially closed magnetic path is produced in the storage cell 10 preventing the formation of stray fields in the storage cell 10. It should be noted from FIG. 1A that the magnetic fields between each of the first and second conductive strips 20 and 22 and the conductive ground plane 12 produced by currents passing through the first and second conductive strips 20, 22 in a direction indicated by the dots as flowing out of the drawing and passing through the ground plane in a direction indicated by an X as flowing into the drawing are in opposite or anti-parallel directions corresponding to the magnetization 56 and 58, respectively, in the two magnetic layers 14, 16. Accordingly, with this arrangement of drive lines and magnetic layers, stray magnetic fields are minimized or eliminated.

In order to provide high packing density, the duration of the drive pulses must be very short, approximately 1 microsecond and preferably less, so as to prevent current spreading in the ground plane. By utilizing pulses having a duration of approximately 10 nanoseconds to 1 microsecond, the current in the conductive ground plane 12 is concentrated into a reflected image of the current in the corresponding conductive strip 20, 22, 24 or 26. Thus, the effective width of the return path in the ground plane 12 for the current passing through the word or bit lines 24, 26 or 20, 22, respectively, is substantially equal to that of the strips 20, 22, 24 or 26. Therefore, the selection and switching of the storing area of the storage cell 10 is made at the intersection of the overlapping word and bit current pulses through the ground plane 12.

When the storage cell 10 is storing a 0 bit of information, the directions of magnetization of the first and second magnetic layers 14 and 16 are opposite to that of the 1 bit of information.

Reading the information stored in the storage cell 10 is accomplished by connecting the load 34 to the bit line 20, 22 by appropriate operation, the switching means 28 and passing a word current pulse through the word line 24, 26. The output pulses are bipolar, a positive voltage representing, for example, a 1 bit of information and a negative voltage representing a 0 bit of information.

It should be noted that by providing the first and second magnetic layers 14 and 16 in a closely spaced relationship there is formed effectively a coupled magnetic film in which magnetostatic coupling substantially eliminates the demagnetizing field in each of the first and second magnetic layers regardless of the direction of magnetization.

Although the operation of the system of the present invention as illustrated in FIGS. 1 and 1A has been described with reference to overlapping orthogonal word and bit magnetic fields indicated by the arrows 50 and 52 of FIG. 2, the system of the present invention may also be operated in a coherent rotational switching mode by employing coincident orthogonal word and bit magnetic fields, neither of which exceeds the value $H_k$, provided the resultant field is without the value of the asteroid of FIG. 2. This latter switching technique produces only partial rotation in known magnetic film storage cells due to the presence of strong blocking stray fields. However, in the system of the present invention the strong magnetostatic coupling eliminates the stray fields which normally prevent the coherent rotational process.

The coherent rotation process may also be employed in the operation of the system of the present invention by applying driving fields to small areas having dimensions substantially not greater than the wavelength of partial rotation or of remaining domains, as described more fully in IBM Journal of Research and Development, Vol. 6, No. 4, October 1962, pp. 394–406 by S. Middlehoek. It has been found that driving fields may be applied to such small areas by using orthogonally arranged strip drive lines each of which has a width on the order of 100 microns. To produce stronger output signals, several storage cells can be combined to store one bit of information by connecting them in parallel.

It should also be understood that the system of the present invention may be operated with a unipolar bit drive pulse by positioning the word line 24, 26 at an acute angle with respect to the easy axis. The acute angle between the easy axis and the word line 24, 26 should be at least equal to the sum of the dispersion and the skew of the magnetic layers 14, 16, which angle is generally greater than 5 degrees. With this latter arrangement, a bit pulse of a given polarity is applied to the bit line 20, 22 along with a word pulse to write, for example, a 1 bit of information and the 0 bit of information is written without applying a bit pulse to the bit line 20, 22.

In FIGS. 3 and 3A of the drawing there is shown an embodiment of the magnetic film storage system of the present invention which is provided with unsymmetrical drive lines. More specifically, the embodiment of FIGS. 3 and 3A includes the storage cell 10 of FIGS. 1 and 1A and the first and third drive lines 20 and 24 which are connected directly to the bit and word drivers 32 and 36, respectively. The bottom or lower drive lines 22, 26 shown in FIGS. 1 and 1A have been eliminated in the embodiment of FIGS. 3 and 3A and there has been substituted therefor a single conductive strip 60 which is used as a sense line. The sense line 60 may have a thickness which is similar to that of the first and third conductive strips 20 and 24 but it preferably has a width which is only a fraction of that of either the first or third conductive strips 20 or 24. The sense line 60 is connected at one end directly to the load 34 and at the other end to the ground plane 12 through the impedance 30. It should be noted that in the embodiment illustrated in FIGS. 3 and 3A the switching means 28 used in the system of FIGS. 1 and 1A has also been eliminated and direct connections have been made between the bit line 20 and the bit driver 32 as well as between the sense line 60 and the load or sense amplifier 34.

In the operation of the embodiment illustrated in FIG. 3 and FIG. 3A, the first magnetic layer 14 is controlled by the superposed fields of the drive currents in the drive lines and the conducting sheet, similarly as described hereinabove. The magnetization in the second magnetic layer sees in this unsymmetrical structure a much smaller drive field than the first magnetic layer. If there exists however a strong enough magnetostatic coupling between layer 14 and layer 16, then the magnetization of layer 16 is always in an anti-parallel state with respect to the magnetization in layer 14. It should be noted, however, that in this unsymmetrical structure the required word current in a particular word line has to have twice the magnitude of the current necessary in the same line when a symmetrical structure is used. Stated otherwise, the effective $H_k$ in an unsymmetrical structure is twice the $H_k$ of a symmetrical structure.

The embodiment of FIGS. 3 and 3A provides a high signal to noise ratio since the drive lines and the sense line are decoupled by placing the drive lines 20, 24 on one side of the magnetic layers 14, 16 and the sense line 60 on the opposite side with the ground plane 12 between them.

In FIG. 4 of the drawing there is illustrated an embodiment of the system of the present invention which includes a planar array 11 having a plurality of storage cells 10.1–10.9 which are defined by the intersections of word lines 24.1–26.1, 24.2–26.2 and 24.3–26.3 and the bit lines 20.1–22.1, 20.2–22.2, and 20.3–22.3. The system is word organized with each of the storage cells 10.1–10.9 being formed in a manner similar to that illustrated in FIGS. 1 and 1A of the drawing.

The word lines 24.1–26.1, 24.2–26.2 and 24.3–26.3 are each connected at one end to a word selection and drive means 64 and at the other end to the ground plane 12.1 through a respective terminating impedance 38.1, 38.2 and 38.3, or, alternatively, directly to the ground plane 12.1. The word selection and drive means 64 provides address selection of a particular word line 24.1–26.1 or 24.2–26.2 or 24.3–26.3 and pulse generation corresponding to the word driver 36 of the system of FIGS. 1 and 1A. The bit lines 20.1–22.1, 20.2–22.2 and 20.3–22.3 are connected at one end selectively to a bit selection and drive means 66 or a load 34.1, 34.2, 34.3, which may be conventional sense amplifiers, through a respective switch 28.1, 28.2 and 28.3 and at the opposite end to the ground plane 12.1 through a respective terminating impedance 30.1, 30.2 and 30.3, or, alternatively, directly to the ground plane 12.1. The loads 34.1, 34.2 and 34.3 and the bit selection and drive 66 are also connected to the ground plane 12.1. The bit selection and drive means 66 provides the function of bit addressing of a particular bit line 20.1–22.1, 20.2–22.2 or 20.3–22.3 and pulse generation corresponding to the bit driver 32 of the system of FIG. 1, while each switch 28.1, 28.2 and 28.3 corresponds to the switch 28 of FIG. 1.

In the operation of the system illustrated in FIG. 4 of the drawing, when 1 and 0 bits of information are to be written into the storage cells, for example, into cells 10.4, 10.5 and 10.6 of the word line 24.2–26.2, the word selection and drive means 64 is operated to pass a current for producing a hard direction field indicated by the arrow 50 of FIG. 2 of the drawing through the word line 24.2–26.2 and the bit selection and drive means 66 is operated to pass through bit lines 20.1–22.1, 20.2–22.2 and 20.3–22.3 currents for producing a magnetic field having polarities indicated by arrow 52 or arrow 54 of FIG. 2 of the drawing corresponding to the bit or digital information to be stored in each of the storage cells 10.4, 10.5 and 10.6, in the manner described hereinabove in connection with the writing of 1 and 0 bits of information in the system of FIGS. 1 and 1A. When information stored in the storage cells 10.4, 10.5 and 10.6 is to be read out, the word selection and drive means 64 is operated to pass a current through the word line 24.2–26.2 to orient the magnetization in the storage cells 10.4, 10.5 and 10.6 in the hard direction. When a destructive read operation is desired, a current having a magnitude sufficient to orient the magnetization completely in the hard direction is passed through the word line 24.2–26.2. When a non-destructive read operation is desired, a current having a magnitude less than that which would completely magnetize both the first and second magnetic layers of each of the storage cells 10.4, 10.5 and 10.6 in the hard direction is passed through the word line 24.2–26.2. The output signals indicative of the stored information in the storage cells 10.4, 10.5 and 10.6 of the word line 24.2–26.2 are bipolar as stated hereinabove in connection with the description of the embodiment of FIG. 1 and are applied to their respective loads 34.1, 34.2 and 34.3 by the proper operation of the switches 28.1, 28.2 and 28.3. Information is written into and read out of the storage cells 10.1, 10.2, 10.3 and 10.7, 10.8 and 10.9 associated with the word lines 24.1–26.1 and 24.3–26.3, respectively, in a similar manner as described hereinabove with the handling of information in the word line 24.2–26.2 by the proper operation of the word and bit selection and drive means 64 and 66.

It can be seen in FIG. 4 of the drawing that non-selected storage cells are not subjected to a stray field from the storage cells of selected neighboring word lines since the strong magnetostatic coupling which is present in all directions between the first and second magnetic layers 14.1 and 16.1 substantially mitigates or eliminates the spreading of stray fields from one storage cell to another.

In FIG. 5 of the drawing there is illustrated another embodiment of the system of the present invention which includes the planar array 11 having storage cells 10.1–10.9 illustrated in the embodiment of FIG. 4 but which differs therefrom in that it includes a non-symmetrical drive scheme utilizing only the bit drive lines 20.1, 20.2, and 20.3 and the word lines 24.1, 24.2 and 24.3, all of which are disposed on one side of the planar array 11, with sense lines 60.1, 60.2 and 60.3 disposed on the opposite side of the planar array 11 aligned with the respective bit lines 20.1, 20.2 and 20.3 to form drive and sense lines for each of the storage cells 10.1–10.9 in a manner similar to that illustrated in FIGS. 3 and 3A of the drawing. One end of each of the bit lines 20.1, 20.2 and 20.3 and sense lines 60.1, 60.2 and 60.3 is connected to the ground plane 12.1 through a respective terminating impedance 30.4, 30.5 and 30.6 and the other end of each of the bit lines 20.1, 20.2 and 20.3 is connected to the bit selection and drive means 66 while the other end of each of the sense lines 60.1, 60.2 and 60.3 is connected to a respective load 34.1, 34.2 and 34.3. The bit selection and drive means 66 and each of the loads 34.1, 34.2 and 34.3 also has a terminal connected to the ground plane 12.1. One end of each of the word lines 24.1, 24.2 and 24.3 is connected to the ground plane 12.1 through a respective terminating impedance 38.4, 38.5 and 38.6 and the other end of each of the word lines 24.1, 24.2 and 24.3 is connected to the word selection and drive means 64, which also has terminals connected to the ground plane 12.1.

The operation of the embodiment of the system of the present invention illustrated in FIG. 5 of the drawing is similar to that described in connection with the embodiment of FIG. 4. The operation of the embodiment of FIG. 5 differs from that of the embodiment of FIG. 4 primarily in that the loads or sense amplifiers 34.1, 34.2 and 34.3 are directly connected to the sense lines 60.1, 60.2 and 60.3 and the bit selection and drive 66 is directly connected to the bit lines 20.1, 20.2 and 20.3 whereas the loads and the bit selection and drive means of the system of FIG. 4 are connected to the common bit and sense lines 20.1–22.1, 20.2–22.2 and 20.3–22.3 through respective switches 28.1, 28. and 28.3.

The embodiments of the system of the present invention illustrated hereinabove have been described as word organized or two-dimensional memory systems. As is known, in such systems the number of word drivers is equal to $n^2$, where $n^2$ equals the number of words in the memory system. It is also known that in a bit organized or three-dimensional memory system, the number of word drivers can be reduced from $n^2$ for the two-dimensional system to $2n$. In accordance with another aspect of this invention a three-dimensional magnetic film storage system is provided by controlling separately the flow of current through each of the two parallel conductive strips disposed on opposite sides forming a word drive line of a storage cell to utilize differences in the angles of rotation of the magnetization towards the hard direction.

To better understand the operation of the three-dimensional system of the present invention, reference may be had again to the embodiment of FIG. 1 of the drawing which illustrates current control switches 40 and 42 disposed between the word driver 36 and the third conductive strip 24 and the fourth conductive strip 26, respectively, forming the word drive line 24–26. When the switch 40 is closed and the switch 42 is opened, the magnetic field distribution produced by current passing through the third conductive strip 24 and the ground plane 12 is as indicated by curve 68 of FIG. 6 of the drawing. The curve 68 is shown with respect to the cross-sectional area of the storage cell 10 and drive lines 24 and 26 taken along the line 6—6 of FIG. 1 which is along the hard axis of the magnetic layers 14 and 16. It can be seen from FIG. 6 of the drawing that the magnetic field distribution indicated by curve 68 produces magnetization in the first magnetic layer 14 in a given direction which is indicated as being negative.

When the switch 42 is closed and the switch 40 is opened, the magnetic field distribution produced by current passing through the fourth conductive strip 26 and the ground plane is as indicated by curve 70 of FIG. 6 of the drawing. It can be seen that the magnetic field distribution indicated by curve 70 of FIG. 6 of the drawing produces magnetization in the second magnetic layer 16 in a direction substantially opposite to the direction of magnetization produced by the magnetic field distribution 68 in the first magnetic layer 14, i.e., in a positive direction. When both the switches 40 and 42 of the system of FIG. 1 of the drawing are closed, a magnetic field distribution indicated by curve 72 of FIG. 6 is produced which is the resultant of the curves 68 and 70. It can be seen from FIG. 6 that the hard direction field produced by current passing simultaneously through the third conductive strip 24 and the fourth conductive strip 26 orients the magnetization toward the hard axis in the first magnetic layer 14 in the negative direction and orients the magnetization in the second magnetic layer 16 in the opposite or positive direction. It has been found that the anti-parallel magnetization produced by this field distribution indicated by curve 72 is switched through an angle $\sin \theta = H/H_k$ where H is the applied field and $H_k$ is the uniaxial anisotropy field. When current is passing through only one of the conductive strips, for example, the third strip 24, the magnetization in the second magnetic layer 16 is switched by the stray field of the magnetization in the first magnetic layer 14 acting in the plane of the second magnetic layer 16. In this case the angle $\theta$ is determined from the equation $\sin \theta = H/2H_k$. Hence, when the word field produced by current passing through only one of the third and fourth conductive strips 24 and 26 is equal to $H_k$, $\theta$ is equal to only about 30°. It has been found by measurements that at this angle the domain pattern of the magnetic layers is not affected by creeping.

In FIG. 7 of the drawing there is illustrated a 3-dimensional magnetic film memory system having four planes or planar arrays 11.1, 11.2, 11.3 and 11.4, each of which has symmetrical drive lines arranged at storage cell locations in a manner similar to that illustrated in FIG. 4 of the drawing. The system includes Z drive lines $Z_1$, $Z_2$, $Z_3$ and $Z_4$ positioned on the lower side of each of the arrays 11.1, 11.2, 11.3 and 11.4 or planes I–IV, each of the lines corresponding to the fourth conductive strip 26 of FIG. 1. The Z lines are connected to a suitable Z drive means 74 which selectively supplies current pulses to the Z lines. A plurality of Y lines, $Y_1$, $Y_2$, $Y_3$ and $Y_4$, each of which is arranged in a zigzag pattern and positioned on the opposite side of a different one of the planes I–IV, provide drive lines corresponding to the third conductive strip 24 of FIG. 1. The Y lines are connected to an appropriate Y drive means 76 which selectively supplies current pulses to the Y lines. The Y and Z lines are arranged so that current passing simultaneously through these lines is travelling in the same direction with respect to each of the storage cells of the planes I–IV as it does in the word lines of the symmetrical drive system of FIG. 4. A plurality of pairs of X lines, for example, lines $X_1$–$X_1'$, $X_2$–$X_2'$, $X_3$–$X_3'$ and $X_4$–$X_4'$ are arranged on each of the planes I to IV in a direction perpendicular to the Y and Z lines, the X lines identified by the primes being located below the planes I–IV while the other line of each pair of X lines is disposed on the upper side of the planes I to IV. Each pair of X lines corresponds to the bit line 20–22 of the system of FIG. 1 and is connected to an X drive and sense means 78 which selectively applies current pulses to the pairs of X lines and during read out operations receives output voltages therefrom. All the X lines of one of the planes I–IV are selectively connected to the X drive and sense means 78 through an associated switching arrangement 80, 82, 84 or 86 operated by the Y word pulse of the one chosen plane I–IV. With the use of these switching arrangements 80, 82, 84 and 86, the number of sense amplifiers required is equal to only the number of bits in one word of the three-dimensional memory system. The writing arrangement of the system of FIG. 7 provides four words in each plane with each word having 4 bits. To select a bit or a word, for example, the word defined by the $Y_2$ line and the $Z_2$ line in plane II into which information is to be written, a first short duration current pulse is supplied to the $Y_2$ line from the Y drive means 76 and concurrently a second short current pulse of a polarity and size similar to that of the $Y_2$ line pulse is supplied to the $Z_2$ line from the Z drive means 74. These first and second pulses create a magnetic field which switches the magnetization of the magnetic layers of each of the storage cells in the $Y_2$–$Z_2$ word toward the hard direction sufficiently to permit short current pulses in the $X_1$–$X_1'$, $X_2$–$X_2'$, $X_3$–$X_3'$ and $X_4$–$X_4'$ lines of plane II to orient the magnetization toward a desired easy axis direction for storing desired 0 and 1 bits in the manner described in connection with the embodiment of FIG. 4. To read out the information stored in the $Y_2$–$Z_2$ word, the first and second short current pulses are again supplied to the $Y_2$ and $Z_2$ line and output signals produced in the $X_2$–$X_2'$, $X_2$–$X_2'$, $X_3$–$X_3'$ and $X_4$–$X_4'$ sense lines of plane II are detected in the X drive and sense means 78.

It has been found that the output signal from an unselected bit or storage cell, i.e., a cell which receives a magnetic field from only a Y line or from only a Z line, is approximately only 13% of the strength of the output signal of a selected bit or cell. Since the output signals are bi-polar any unwanted signals in the X sense lines from the unselected bits will tend to cancel out each other. To further reduce noise in the X sense lines the short current pulse in the $Z_2$ line is delayed with respect to the short current pulse in the $Y_2$ line and the sense amplifiers are connected to the X lines by the switching arrangement 82 after the onset of the pulse in the $Y_2$ line and during the onset of the pulse on the $Z_2$ line to sense substantially only the selected bits. Known means, such as the use of strobing techniques or the use of dummy lines, may be employed to prevent the drive currents generated during the write operation from being detected by the sense amplifiers when the switching arrangements 80, 82, 84 or 86 again connect X lines to the X drive and sense means 78.

While the invention has been particularly shown and described with reference to preferred embodiments thereof, it will be understood by those skilled in the art that various changes in form and details may be made therein without departing from the spirit and scope of the invention.

What is claimed is:

1. A system comprising:
   (a) a pair of layers of magnetic material having magnetic remanence and a given width,
   (b) a layer of electrically conductive material interposed between said magnetic layers, said pair of magnetic layers being magnetostatically coupled to each other,
   (c) means including at least one conductor of drive currents electrically coupled to said interposed electrically conductive layer as a return path for varying the magnetization of an area of said magnetic layers having a width substantially less than that of said given width, and
   (d) means for detecting magnetization variations in at least one of said magnetic layers.

2. A system as set forth in claim 1 wherein said conductor includes a given conductive strip having a width substantially less than said given width.

3. A system as set forth in claim 2 wherein said magnetization varying means includes a second conductive strip disposed perpendicular to said given conductive strip and electrically coupled to said conductive layer as a return path.

4. A system as set forth in claim 3 wherein said magnetization varying means further includes means for applying short duration pulses to said given and second conductive strips.

5. A system as set forth in claim 4 wherein said pulses have a duration less than approximately one microsecond.

6. A system as set forth in claim 2 wherein said magnetization varying means further includes an additional conductive strip similar to and aligned with said given strip, said magnetic and conductive layers being interposed between said strips.

7. A system as set forth in claim 6 wherein said magnetization varying means further includes a pair of conductive strips disposed perpendicular to said given and additional conductive strips, said magnetic and conductive layers being interposed between said pair of strips.

8. A system as set forth in claim 7 wherein said magnetization varying means further includes means for applying pulses to said strips having a time duration less than approximately one microsecond.

9. A system as set forth in claim 2 further including means for sensing magnetization variations in said magnetic layers, said sensing means including a sense strip disposed perpendicular to said given strip, said magnetic and conductive layers being interposed between said given and sense strips.

10. A system as set forth in claim 9 wherein said given and sense strips are electrically coupled to said conductive layer.

11. A system as set forth in claim 6 wherein said magnetization varying means further includes means for selectively applying pulses having a duration less than approximately one microsecond to each of said given and additional conductive strips.

12. A system as set forth in claim 11 wherein said magnetization varying means further includes a pair of conductive strips disposed perpendicular to said given and additional conductive strips, said magnetic and conductive layers being interposed between said pair of strips.

13. A system as set forth in claim 11 wherein said pair of magnetic layers has an easy axis and said given and additional conductive strips are substantially aligned with said easy axis.

14. A system comprising:
   (a) a pair of layers of magnetic material having magnetic remanence,
   (b) a layer of electrically conductive material interposed between said magnetic layers, said pair of magnetic layers being magnetostatically coupled to each other,
   (c) means including conductors of drive currents electrically coupled to said interposed electrically conductive layer as a return path for selectively varying the magnetization of a plurality of areas of said magnetic layers disposed in two dimensions for handling a like plurality of binary digits of information, and
   (d) means for detecting magnetization variations in said plurality of areas.

15. A system as set forth in claim 14 wherein said conductors include a first set of parallel conductive strips magnetically coupled to said magnetic layers and a second set of parallel conductive strips disposed perpendicular to said first strips and magnetically coupled to said magnetic layers, the intersections of said first and second sets of strips defining said plurality of areas.

16. A system as set forth in claim 15 wherein said magnetization varying means further includes third and fourth sets of parallel conductive strips electrically coupled to said conductive layer as a return path, the strips of said third set being aligned with the strips of said first set and the strips of said fourth set being aligned with the strips of said second set, said magnetic and conductive layers being interposed between said first and third sets and between said second and fourth sets.

17. A system as set forth in claim 16 wherein said magnetization varying means further includes means for applying pulses having a time duration less than approximately one microsecond to said strips.

18. A system as set forth in claim 17 wherein said magnetic layers have a common easy axis of magnetization and one of said sets of strips is substantially aligned with said easy axis.

References Cited

UNITED STATES PATENTS 3,191,162 6/1965 Davis -------------- 340—174

OTHER REFERENCES

Electronic Design, pp. 28–29, June 7, 1963.

BERNARD KONICK, *Primary Examiner.*

BARRY L. HALEY, *Assistant Examiner.*